(12) United States Patent
Semagina et al.

(10) Patent No.: US 9,040,449 B2
(45) Date of Patent: May 26, 2015

(54) PLATINUM-FREE MONOMETALLIC AND BIMETALLIC NANOPARTICLES AS RING-OPENING CATALYSTS

(71) Applicant: GOVERNORS OF THE UNIVERSITY OF ALBERTA, Edmonton, Alberta (CA)

(72) Inventors: Natalia Semagina, Edmonton (CA); Xing Yin, Calgary (CA); Jing Shen, Edmonton (CA); Kavithaa Loganathan, Edmonton (CA)

(73) Assignee: Governors of the University of Alberta, Edmonton, Alberta (CA)

(*) Notice: Subject to any disclaimer, the term of this patent is extended or adjusted under 35 U.S.C. 154(b) by 35 days.

(21) Appl. No.: 13/748,370

(22) Filed: Jan. 23, 2013

(65) Prior Publication Data
US 2013/0248414 A1    Sep. 26, 2013

Related U.S. Application Data

(60) Provisional application No. 61/614,382, filed on Mar. 22, 2012.

(51) Int. Cl.
| | | |
|---|---|---|
| *B01J 23/00* | (2006.01) | |
| *B01J 23/42* | (2006.01) | |
| *B01J 23/44* | (2006.01) | |
| *B01J 23/56* | (2006.01) | |

(Continued)

(52) U.S. Cl.
CPC .......... *B01J 23/468* (2013.01); *B01J 23/44* (2013.01); *B01J 23/462* (2013.01); *C10G 45/62* (2013.01); *Y10S 977/773* (2013.01); *Y10S 977/81* (2013.01); *Y10S 977/892* (2013.01); *B82Y 40/00* (2013.01); *B01J 37/08* (2013.01); *B01J 37/18* (2013.01); *B01J 21/04* (2013.01); *B01J 23/464* (2013.01); *B01J 23/64* (2013.01); *B01J 23/6567* (2013.01); *B01J 23/892* (2013.01); *B01J 35/0013* (2013.01); *B01J 35/006* (2013.01); *B01J 35/08* (2013.01); *B01J 37/0018* (2013.01); *B01J 37/0207* (2013.01); *B01J 37/0211* (2013.01); *C10G 45/60* (2013.01); *B82Y 30/00* (2013.01)

(58) Field of Classification Search
USPC .................. 502/300, 325, 332, 333, 335, 339
See application file for complete search history.

(56) References Cited

U.S. PATENT DOCUMENTS

| | | | |
|---|---|---|---|
| 3,511,888 A | | 5/1970 | Jenkins |
| 3,600,301 A | * | 8/1971 | Rausch .................... 208/111.05 |

(Continued)

FOREIGN PATENT DOCUMENTS

WO    WO 2007/041605    4/2007

OTHER PUBLICATIONS

"PVP-stabilized mon- and bimetallic Ru nanoparticles for selective ring opening," Jing Shen et al. Catalysis Science and Technology 2013, 3, pp. 208-221.*

(Continued)

*Primary Examiner* — Patricia L Hailey
(74) *Attorney, Agent, or Firm* — Sheridan Ross P.C.

(57) ABSTRACT

Nanoparticle catalyst compositions and methods for preparation of same are described. The nanoparticle catalysts are platinum-free and are useful in effecting selective ring-opening reactions, for example in upgrading heavy oil. The catalyst may be of monometallic composition, or may comprise an alloyed or core-shell bimetallic composition. The nanoparticles are of controlled size and shape.

63 Claims, 2 Drawing Sheets

(51) Int. Cl.

| | | |
|---|---|---|
| B01J 23/46 | (2006.01) | |
| C10G 45/62 | (2006.01) | |
| B01J 37/18 | (2006.01) | |
| B01J 21/04 | (2006.01) | |
| B01J 23/64 | (2006.01) | |
| B01J 23/656 | (2006.01) | |
| B01J 23/89 | (2006.01) | |
| B01J 35/00 | (2006.01) | |
| B01J 35/08 | (2006.01) | |
| B01J 37/00 | (2006.01) | |
| C10G 45/60 | (2006.01) | |
| B82Y 40/00 | (2011.01) | |
| B01J 37/08 | (2006.01) | |
| B01J 37/02 | (2006.01) | |
| B82Y 30/00 | (2011.01) | |

(56) References Cited

U.S. PATENT DOCUMENTS

| | | | | |
|---|---|---|---|---|
| 6,090,858 | A | 7/2000 | El-Sayed | |
| 6,589,416 | B2* | 7/2003 | Baird et al. | 208/138 |
| 7,045,481 | B1 | 5/2006 | Parasher et al. | |
| 7,534,741 | B2 | 5/2009 | Wu et al. | |
| 7,601,668 | B2 | 10/2009 | Zhou et al. | |
| 7,655,137 | B2 | 2/2010 | Zhou et al. | |
| 7,700,514 | B2* | 4/2010 | Mabilon et al. | 502/224 |
| 2002/0040175 | A1* | 4/2002 | Baird et al. | 585/700 |
| 2007/0062848 | A1 | 3/2007 | Oballa et al. | |
| 2008/0220296 | A1* | 9/2008 | Eichhorn et al. | 429/17 |
| 2011/0200915 | A1* | 8/2011 | Goto et al. | 429/524 |
| 2012/0088651 | A1* | 4/2012 | Lin et al. | 502/5 |
| 2012/0296124 | A1* | 11/2012 | Asefa et al. | 564/417 |
| 2013/0264198 | A1* | 10/2013 | Wang | 204/290.14 |

OTHER PUBLICATIONS

"Hydrogenation and Ring Opening of Aromatic and Naphthenic Hydrocarbons Over Noble Metal (Ir, Pt, Rh)/Al2O3 Catalysts," Anne Piegsa et al. Catalysis Letters (2012), 142, pp. 531-540.*

Bönnemann et al., "Metal Nanoclusters: Synthesis and Strategies for their Size Control," Metal Nanoclusters in Catalysis and Materials Science: The Issue of Size Control, Ed. Corain et al, Elsevier B.V., 2008, pp. 21-22.

Chen et al., "Size-controlled synthesis of Ru nanoparticles by ethylene glycol reduction," Materials Letters, 2008, vol. 62, Iss. 6-7, pp. 1018-1021.

Li et al., "Size Effects of PVP-Pd Nanoparticles on the Catalytic Suzuki Reactions in Aqueous Solution," Langmuir, 2002, vol. 18, Iss. 12, pp. 4921-4925.

Navarro et al., "Hydrogenation of Aromatics on Sulfur-Resistant PtPd Bimetallic Catalysts," Journal of Catalysis, 2000, vol. 189, Iss. 1, pp. 184-194.

Nylén et al., "Catalytic ring opening of naphthenic structures: Part I. From laboratory catalyst screening via pilot unit testing to industrial application for upgrading LCO into a high-quality diesel-blending component", Applied Catalysis A: General, 2006, vol. 299, pp. 1-13.

Nylén et al., "Low and high-pressure ring opening of indan over 2 wt.% Pt, Ir- and bi-metallic $Pt_{25}Ir_{75}$/boehmite catalysts prepared from microemulsion systems," Applied Catalysis A: General, 2004, vol. 262, Iss. 2, pp. 189-200.

Rioux et al., "Monodisperse platinum nanoparticles of well-defined shape: synthesis, characterization, catalytic properties and future prospects," Topics in Catalysis, 2006, vol. 39, Iss. 3-4, pp. 167-174.

Teranishi et al., "Size Control of Palladium Nanoparticles and Their Crystal Structures," Chemistry of Materials, 1998, vol. 10, Iss. 2, pp. 594-600.

Wang et al., "Preparation of Pd—Pt Bimetallic Colloids with Controllable Core/Shell Structures", Journal of Physical Chemstry B, 1997, vol. 101, No. 27, pp. 5301-5306.

Yan et al., "Size control of polymer-stabilized ruthenium nanoparticles by polyol reduction," Journal of Materials Chemistry, 2001, vol. 11, pp. 3387-3391.

Zou et al., "Enantioselective hydrogenation of methyl pyruvate over polymer-stabilized and supported iridium clusters," Journal of Molecular Catalysis A: Chemical, 1999, vol. 147, Iss. 1-2, pp. 63-72.

* cited by examiner

PLATINUM-FREE MONOMETALLIC AND BIMETALLIC NANOPARTICLES AS RING-OPENING CATALYSTS

CROSS-REFERENCE TO RELATED APPLICATIONS

The present application claims priority to pending U.S. Provisional Patent Application No. 61/614,382, filed Mar. 22, 2012, the entire disclosure of which is hereby incorporated herein by reference in its entirety.

FIELD OF THE INVENTION

The present invention relates generally to the use of nanotechnology in facilitating the upgrading fractions of heavy crude oils. More particularly, the present invention relates to monometallic and bimetallic nanoparticulate catalysts with controlled size and structure, methods for making such catalysts, and the use of such catalysts in effecting selective ring-opening reactions. These catalysts may be useful in the heavy oil upgrading processes to improve the cetane number of the diesel fraction, and may be applied to heavier fractions to achieve quality improvements.

BACKGROUND OF THE INVENTION

The catalytic ring opening of naphthenic molecules in the upgrading of heavy crude oils is a preferred reaction for improving the cetane number of the diesel fraction. Contrary to other upgrading options such as hydrogenolysis and cracking of hydrocarbons, catalytic ring opening is a selective reaction, cleaving the naphthenic ring only once to avoid a reduction in the number of carbon atoms per molecule. However, not all selective ring opening reactions produce an equivalent upgrading effect. That is, when ring opening occurs at unsubstituted carbon-carbon bonds, the octane number is improved in the gasoline fraction, while ring opening at substituted carbon-carbon bonds improves the cetane number of the diesel fraction.

Catalytic selective ring opening in heavy oil upgrading has been studied using both single-ring compound models like methylcyclopentane (MCP) and methylcyclohexane, as well as with multiple-ring compound models such as indan, decalin, tetralin, naphthalene, and phenanthrene, etc.

Platinum group metals are known to selectively catalyze the ring opening of naphthenes, and most ring opening catalysts therefore contain platinum as the major component. Platinum metal—based catalysts are currently used in various middle distillate upgrading processes. The majority of these monometallic or bimetallic catalysts (containing another transition or post-transition metal) are prepared using traditional methods—that is, via support impregnation with molecular precursors of the desired active component(s). As such, traditional synthesis of Pt—Sn/SiO$_2$ or Pt—Bi/SiO$_2$ catalysts for use in dehydrogenating paraffins has been previously described, for example in U.S. Pat. No. 3,511,888. Another example, described in U.S. Patent Application Publication No. 2007/0062848, discloses a process to treat a feed with a high portion of aromatic compounds with two or more fused aromatic rings. The catalysts proposed include one or more metals selected from the group of Pd, Rh, Ru, Ir, Os, Cu, Co, Ni, Pt, Fe, Za, Ga, In, Mo, W or V deposited preferably on zeolites via ion exchange or impregnation. Methods typically used in generating these catalysts result in polydispersed metal nanoparticles, which consume expensive metals in catalytically unfavorable size and structure modes.

Generally, the activity and selectivity of catalysts depends on the type of metal, metal particle sizes, and the nature of the supports. Recent breakthroughs have allowed the production of metal nanoparticles with controlled size and shape, however the final structure, properties, and behaviour of these catalysts depends strongly on synthesis conditions and metal nature. Moreover, it appears that knowledge gained regarding the synthesis conditions and nanoparticle structure effective in the preparation of one particular type of catalyst may not be readily transferable to the preparation of other types of catalysts. Accordingly, guidance regarding the reliable synthesis of nanoparticle catalysts having a consistent and reproducible size, structure and chemical composition has not been available for the particular application, and catalytic behaviour cannot necessarily be predicted.

For example, U.S. Pat. No. 6,090,858 describes the generation of cubic, tetrahedral, and polyhedral platinum group nanoparticles formed in the presence of a capping agent. Palladium and ruthenium monometallic nanoparticles have been formed, however the conditions for formation of each of these nanoparticles are distinct, and the utility of these monometallic nanoparticles is not definitely known a priori. Suitable reaction conditions can be found only by extensive experimentation.

The literature regarding stabilized bi- and tri-metallic nanoparticles shows that, likewise, these particles may be generated by following well known colloidal chemistry techniques. However, each catalytic application requires its own optimized combination of metals and nanoparticle structure modes. Some references describe the use of Pt, Pd, R, Ir, and mixtures thereof, and some include a second component selected from Sn, Re, Ge, Pb, As, Sb, W, Os, Cd, In, Ti, P, Ga, Ru, Ca, Mg, Ba, Sr. However, the best performance in the literature has been achieved using platinum as the major component (see, for example, U.S. Pat. No. 7,655,137, which describes a Pt—Re catalyst, and U.S. Pat. No. 7,569,508, which describes a Pt—Sn catalyst). Across the field of catalyst literature, bimetallic catalyst activity and selectivity strongly depend on nanoparticle size, structure, and chemical composition. Thus, the teachings of the literature cannot easily or predictably be applied across the range of intended species to provide a desired catalytic behaviour.

SUMMARY OF THE INVENTION

In accordance with various embodiments of the present invention, the present disclosure is concerned with monometallic and bimetallic nanoparticulate catalysts with controlled structure and size. Examples of bimetallic structures include monometallic polymer-stabilized nanoparticulates, core-shell nanoparticulates and alloyed nanoparticles. Specific catalyst compositions, methods for making said catalysts, and methods for using said catalysts are described.

In accordance with a first aspect of the invention, there is provided a ring-opening catalyst composition comprising: a plurality of monodispersed nanoparticles, each of the monodispersed nanoparticles having a size between 1-5 nm in diameter. Each of the monodispersed nanoparticles comprises: a primary non-platinum transition metal having ring-opening catalytic activity; and a secondary transition metal.

In various implementations, the primary non-platinum transition metal may have activity and selectivity in catalyzing single-cleavage ring-opening reactions. For example, the primary transition metal may be palladium, ruthenium, rhodium, iridium, or rhenium.

In various implementations, the secondary transition metal may be a catalytically active transition metal. For example, the secondary metal may have ring-opening catalytic activity, hydrodesulfurization activity, or hydrogenation activity. Alternatively, the secondary transition metal may be catalytically inactive.

In various embodiments of the above-noted implementations of the first aspect of the invention, the secondary transition metal may be selected from the group consisting of: palladium, nickel, ruthenium, rhenium, and rhodium.

In any implementation of the first aspect of the invention, the ring-opening catalyst may further comprise a capping or stabilizing agent. The agent may be polyvinylpyrrolidone.

In some implementations, the nanoparticle is an alloy of the primary and secondary metal, with mixed surface active sites. In some implementations, the nanoparticle has a core-shell structure, wherein the secondary metal comprises the nanoparticle core and the primary metal comprises the nanoparticle shell.

In an embodiment, the nanoparticle has a core-shell structure, and the primary metal and the secondary metal are the same non-platinum metal.

In any implementation of the first aspect of the invention, the bimetallic nanoparticle ring-opening catalyst may further comprise a support loaded with the nanoparticles. The support may have a minimum pore size of at least 5 nm to accommodate the presynthesized nanoparticles. For example, the support may be gamma-alumina.

In accordance with a second aspect of the invention, there is provided a monometallic ring-opening catalyst composition comprising: a plurality of monodispersed nanoparticles, each of the monodispersed nanoparticles having a size between 1-5 nm in diameter, each of the monodispersed nanoparticles comprising a primary non-platinum transition metal having ring-opening catalytic activity; and, a support having a minimum pore size of at least 5 nm.

In any implementation of the second aspect of the invention, the ring-opening catalyst may further comprise a capping or stabilizing agent. The agent may be polyvinylpyrrolidone.

In some implementations of the second aspect of the invention, the support may be gamma-alumina.

In various implementations of the second aspect of the invention, the primary non-platinum transition metal is palladium, ruthenium, rhodium, iridium, or rhenium.

In accordance with a third aspect of the invention, there is provided a method for forming a platinum-free nanoparticle ring-opening catalyst, the method comprising the steps of:
providing a primary metal precursor and a stabilizing polymer, the primary metal precursor comprising a primary metal having ring-opening catalytic activity;
refluxing the primary metal precursor with the stabilizing polymer to create a colloidal dispersion of a polymer-stabilized primary metal nanoparticle;
adding acetone to the colloidal dispersion to precipitate polymer-stabilized nanoparticles therefrom;
depositing the precipitated nanoparticles onto a support, the support having a minimum pore size of at least 5 nm; and
calcining the deposited nanoparticles to remove the stabilizing polymer from the nanoparticles; and
reducing the deposited nanoparticles in a hydrogen-rich environment.

In some embodiments of the third aspect of the invention, the primary metal is palladium, ruthenium, rhodium, iridium, or rhenium. Polyvinylpyrrolidone may be used as the stabilizing polymer. Gamma-alumina may be used as a support. The nanoparticles may be deposited onto the support by wet impregnation.

In some embodiments of the third aspect of the invention, the support may be over-dried prior to depositing the nanoparticles on the support.

In accordance with a fourth aspect of the invention, there is provided a method for forming a platinum-free nanoparticle ring-opening catalyst, the method comprising the steps of:
providing a secondary metal precursor and a stabilizing polymer;
refluxing the primary metal precursor with the stabilizing polymer to create a colloidal dispersion of a polymer-stabilized secondary metal nanoparticle;
providing a reduced primary metal precursor, the primary metal precursor comprising a primary metal having ring-opening catalytic activity;
reducing and hydrogenating the polymer-stabilized secondary metal nanoparticles;
combining the hydrogenated polymer-stabilized secondary metal nanoparticle with the reduced primary metal precursor in a hydrogen-rich environment to generate polymer-stabilized nanoparticles having a primary metal shell deposited over a secondary metal core;
adding acetone to precipitate the polymer-stabilized nanoparticles;
depositing the polymer-stabilized nanoparticles onto a support having a minimum pore size of at least 5 nm;
calcining the deposited nanoparticles to remove the polymer from the nanoparticles; and
reducing the nanoparticles in a hydrogen-rich environment.

In certain embodiments of the fourth aspect of the invention, the primary metal is palladium, ruthenium, rhodium, iridium, or rhenium.

In some implementations of the fourth aspect of the invention, the secondary metal precursor comprises a secondary metal having catalytic activity. For example, the secondary metal precursor may include iridium, palladium, ruthenium, rhenium, rhodium, or nickel. The primary and secondary metal may be the same metal.

In one implementation of the fourth aspect of the invention, the primary metal precursor comprises iridium and the secondary metal precursor comprises palladium.

In any implementation of the fourth aspect of the invention, the stabilizing polymer may be polyvinylpyrrolidone. The support may comprise gamma-alumina.

In any implementation of the fourth aspect of the invention, the method may further comprise a step of over drying the support prior to the step of depositing the precipitated nanoparticles. The nanoparticles may be deposited onto the support by wet impregnation.

In accordance with a fifth aspect of the invention, there is provided a method for forming a platinum-free nanoparticle ring-opening catalyst, the method comprising the steps of:
refluxing a mixture of a primary metal precursor with a secondary metal precursor and a stabilizing polymer to generate a colloidal dispersion of alloyed nanoparticles, the primary metal precursor comprising a metal having ring-opening catalytic activity;
adding acetone to the colloidal dispersion to precipitate the alloyed nanoparticles therefrom;
depositing the polymer-stabilized bimetallic nanoparticles onto a support having a minimum pore size of at least 5 nm;
calcining the deposited nanoparticles to remove the polymer from the nanoparticles; and
reducing the deposited nanoparticles in a hydrogen-rich environment.

In any implementations of the fifth aspect of the invention, the primary metal may be palladium, ruthenium, rhodium, iridium, or rhenium.

In any implementation of the fifth aspect of the invention, the secondary metal precursor may comprise a secondary metal having catalytic activity. For example, the secondary metal precursor may be selected from the group consisting of: iridium, palladium, ruthenium, rhenium, and rhodium.

In one embodiment of the fifth aspect of the invention, the primary metal precursor comprises iridium and the secondary metal precursor comprises palladium.

In any embodiment of the fifth aspect of the invention, the stabilizing polymer may be polyvinylpyrrolidone.

In any embodiment of the fifth aspect of the invention, the support may be gamma-alumina. The support may be dried prior to the step of depositing the nanoparticles onto the support. The nanoparticles may be deposited onto the support by wet impregnation.

In accordance with a sixth aspect of the invention, there is provided a method for effecting selective cleavage of a naphthenic ring, the method comprising the steps of:

preparing a bimetallic nanoparticle catalyst according to any one of claims 1 through 33; and, reacting a composition containing naphthenic ring-containing compounds with hydrogen at a temperature greater than 300° C. in the presence of the bimetallic nanoparticle.

In any implementation of the sixth aspect of the invention, the method may further include the step of separating the bimetallic nanoparticle from the reaction products.

The composition containing naphthenic ring-containing compounds may be a heavy oil fraction.

BRIEF DESCRIPTION OF THE DRAWINGS

Embodiments of the present invention will now be described, by way of example only, with reference to the attached Figures, wherein.

DETAILED DESCRIPTION

Figure 1:
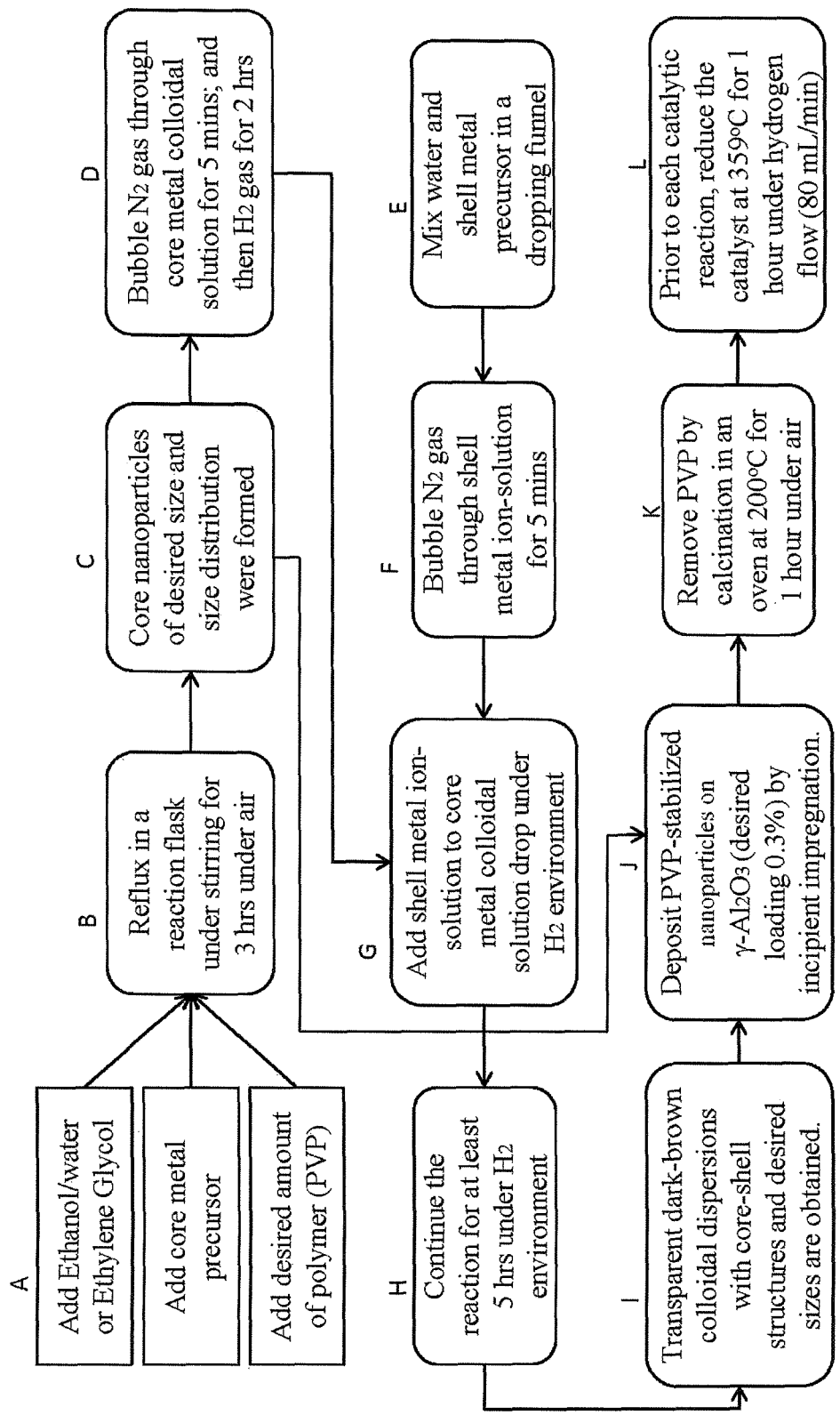
FIG. 1 is a flowchart depicting general steps for monometallic and bimetallic core-shell nanoparticle catalyst synthesis using successive reduction.

Effective nanoparticle ring-opening catalysts are described, in which the use of platinum is avoided to reduce the cost associated with traditional/existing ring-opening catalysts. A polymer-stabilized nanoparticle structure and appropriate selection of the specific monometallic or bimetallic composition will produce a cost effective and useful platinum-free catalyst.

Generally, the catalyst particles, whether monometallic or bimetallic, have a controlled size and structure. While the shape of the nanoparticles is not critical, spherical particles generally provide greater thermodynamic stability than other nanoparticle structures, and sizes between 1 nm and 5 nm have been most common. The use of polymers in stabilizing these structures, also known as ligands or capping agents, is well-known. For example, polyvinylpyrrolidone (PVP) and polyvinylacrylamide are common choices for nanoparticle stabilization. However, selection of an appropriate stabilizing polymer is dependent on the particular metal or metal combination of interest and requires a certain amount of experimentation. Further, methods for removal of the polymer (to increase the catalyst surface area) also vary depending on the metal or metal combination, and care must be taken to minimize any reduction in catalytic activity based on steps taken to remove the polymer.

Traditional methods used in the formation of metallic nanoparticles have typically involved the impregnation of a suitable support (for example gamma-alumina) with metal precursors, allowing deposit of the bimetallic components onto the external and internal surface of the support together. However, in the present method, a simultaneous or successive reduction method is utilized to generate the catalyst nanoparticles, which are then deposited onto a suitable support by incipient impregnation.

Regarding proposed utility of the catalysts described herein, selective ring-opening catalysts are used in hydrocarbon refinery methods to cleave naphthenic molecules and improve the quality of fuels. Currently available commercial ring opening catalysts are either monometallic catalysts containing platinum, or bimetallic catalysts containing two noble metals (of which one is platinum), deposited on an alumina ($Al_2SO_3$) substrate.

The presently described ring-opening catalysts are efficient and cost effective when compared to existing platinum-based catalysts, with favorable single cleavage selectivity. Briefly, the nanoparticle is designed such that a suitable catalytically active non-platinum metal is present on the outer surface of the nanoparticle. In the case of a monometallic nanoparticle catalyst, the metal is reduced in the presence of an appropriate polymer to form a size-controlled nanoparticle. In the case of certain bimetallic catalysts (here termed alloyed catalysts) a primary catalytically active metal may be reduced along with a secondary compatible metal. The secondary metal may also be catalytically active. In other bimetallic catalysts (termed core-shell catalysts) the primary catalytically active metal may instead be reduced over a secondary metal nanoparticle core to form a catalytically active shell. In all cases, the structure and size of the nanoparticle is controlled by the selection of an appropriate synthesis procedure.

Regarding the bimetallic core-shell nanoparticle catalysts, the primary metal, or shell metal, is selected to possess a high activity and selectivity for the specific primary catalysis application of interest. The secondary metal, or core metal, may be selected for its secondary catalytic activity, or based on its availability or low cost. In many applications, particularly where catalyst recycling will not be practical, the core metal may be selected primarily on the basis of cost and ability to form suitable stabilized nanoparticles, without being incompatible with the shell metal. In some cases, there may be a synergistic effect between the core and shell metals, or between the alloyed metals.

In the case of a monometallic nanoparticle, or a bimetallic core-shell nanoparticle, a suitable metal precursor is first reduced in the presence of an appropriate polymer to form a size-controlled nanoparticle. Subsequently, in the case of the bimetallic core-shell nanoparticle catalyst, a suitable primary metal is deposited over the core nanoparticle structure. In preliminary testing, iridium has been identified as a suitable primary metal for this application.

Metals Used in Catalyst Preparation

In the present description, the term "primary metal" is intended to refer to a transition metal having ring-opening catalytic activity. Generally, the primary metal will be a noble metal. For clarity, the noble metals include ruthenium, rhodium, palladium, silver, osmium, iridium, platinum, and gold. Traditionally, platinum has been the most commonly used noble metal in the preparation of ring-opening catalysts.

The primary metal used in the presently described nanoparticle catalysts, however, is not platinum. In fact, preliminary testing indicated that selecting a non-platinum noble metal in the nanoparticle shell can produce a more effective catalyst than those that do contain platinum in the nanoparticle shell. In most practical applications, the primary metal is chosen from among the least precious of the noble metals to decrease the cost of catalyst production. In addition, noble metals such as mercury and osmium will likely not be suitable due to the poisonous nature of mercury and the expected unpredictability of osmium-containing nanoparticle synthesis. That is, the primary metal is selected from the following group: Palladium, ruthenium, rhodium, iridium, and rhenium. In testing to date, iridium has been shown to be a suitable primary metal for use in the generation of the present catalysts.

In the present description, the term "secondary metal" is intended to refer to a transition metal that is compatible with the primary metal and with the chosen method of nanoparticle synthesis. When a core-shell structure is selected, the secondary metal should be selected from those transition metals which can form nuclei for the successive growth of a primary metal shell, avoiding further growth of the secondary metal into individual monometallic nanoparticles. More specifically, the secondary metal should form metal hydrides in the presence of hydrogen donors to facilitate the reduction of the primary metal precursor onto the nanoparticle (secondary metal core) surface. In most applications, the secondary metal for use in generation of a core-shell nanoparticle is chosen from: palladium, nickel, ruthenium, rhenium, rhodium, and similar metals. In testing to date, palladium and nickel have been found to be suitable secondary metals for use in a core-shell structure.

When a bimetallic alloyed nanoparticle is selected, the secondary metal is selected from those transition metals which can be co-reduced in the presence of the primary metal so that nanoparticles with the two atom types are formed without the formation of individual nanoparticles from the primary and secondary metal. The secondary metal should also synergistically affect or at least not significantly inhibit the catalytic performance of the primary metal through electronic and geometric effects. Generally, the secondary metal for a bimetallic alloyed nanoparticle is chosen from: palladium, ruthenium, rhenium, rhodium, and similar metals.

As noted above, transition metals are generally suitable for use as a secondary metal in the presently described catalysts. Transition metals are known to be effective catalysts, and many are inexpensive and readily available. In addition, the secondary metal may be selected for a particular secondary catalytic effect, or may simply be selected based on cost and availability. For example, ruthenium is an effective hydrodesulfurization catalyst (while nickel would be a suitable, less expensive alternative) so can be used as a secondary metal when a catalyst is generated for use in reactions requiring ring-opening and hydrodesulfurization. Likewise, palladium may be used as a secondary metal for ring opening reactions that may also benefit from hydrogenation.

Methods

Previously, ring opening catalysts have been formed by impregnation of a support with metal precursors, resulting in inconsistent, poorly controlled catalyst structures. Instead, the present bimetallic nanoparticle catalysts are prepared either via simultaneous reduction of metal precursors to produce alloyed bimetallic nanoparticles, or via successive reduction (also known as hydrogen-sacrificial technique), resulting in a monodispersed core-shell nanoparticle structure. These nanoparticles are stabilized by a commercially available polymer (for example, PVP), and deposited on a suitable substrate, for example gamma-alumina. The polymer is later removed to increase the surface area of the catalyst, improving activity. Importantly, the resulting platinum-free catalysts appear to provide favourable ring-opening selectivity and indan conversion in comparison to commercially available platinum-based catalysts. While certain method steps used in the generation of the present catalysts may independently have been previously described within the prior art, the combination of these method steps to produce the present catalysts has not previously been taught and cannot be successfully predicted from the prior art. As was determined by extensive experimentation, modification of these conditions in any step may result in some loss of catalytic activity or selectivity.

Recent breakthroughs in nanotechnology and colloidal chemistry techniques have allowed the production of metal nanoparticles with controlled size and shape. The use of various stabilizing agents, such as surfactants, polymers, electrostatic stabilizers, to prepare metallic nanoparticles has been actively exploited. Although the studies have all involved the same basic principle of controlled metal nanoparticle formation from molecular precursors in the presence of steric and/or electrostatic protective agents, the final nanoparticle structure and properties are known to depend strongly on the synthesis conditions and the metals selected.

Regarding synthesis of monometallic nanoparticles, U.S. Pat. No. 6,090,858 discloses the shape-controlled preparation of monometallic cubic, tetrahedral and polyhedral platinum group nanoparticles. A capping agent was required to stabilize the nanoparticles, and was found to be crucial to achieving the desired nanoparticle shape and size up to 18 nm. The type of the reducing agent, amount of polymer, and synthesis temperature have also been shown to affect the size of polyvinylpyrrolidone (PVP)-stabilized monometallic Ru nanoparticles (X. Yan, H. Liu, K. Y. Liew, "Size control of polymer-stabilized ruthenium nanoparticles by polyol reduction", J. Mater. Chem. 2001, 11, 3387-3391).

Two commonly used reduction techniques to synthesize bimetallic nanoparticles are simultaneous reduction and successive reduction of two different metal ions. Theoretically, bimetallic particles may form a random alloy, core-shell, and inverted core-shell structures (Metal nanoclusters in catalysis and materials science: the issue of size control, Eds. B. Corain, G. Schmid, and N. Toshima, Elsevier B. V. (2008)). In successive reduction, core metal precursors are reduced first, followed by the reduction of shell metal precursors. The core-shell structures are obtained by the formation of strong metallic bonds between the core and shell metal atoms. This method was initially developed for inverted core-shell structures, when the core should be formed from the metal with lower redox potential. The simultaneous reduction of two metal ions with different redox potentials often leads to normal core-shell structures; alloys could also be formed if metal ratios are changed. However, it is not possible to obtain inverted core-shell structures using this technique.

In order to prepare bimetallic nanoparticles with different sizes and controllable core-shell structures, a hydrogen-sacrificial protective strategy for successive reduction has been developed. In this method, the synthesized monometallic particles (core element) of different sizes are treated by hydrogen, and form metal hydrides on the metal surface. The hydrogen atoms have a very strong reducing ability due to the low redox potential. Consequently, metal ions are easily reduced to metal atoms by the hydrogen atoms on the surface, and form a shell. For example, polymer-stabilized Pt(core)Pd(shell) nanoparticles with mean diameters of 1.5-5.5 nm were prepared by successive reduction via $H_2$ (Y. Wang and N.

Toshima, "Preparation of Pd—Pt bimetallic colloids with controllable core/shell structures", *J. Phys. Chem. B* 101 (1997) 5301).

Given the degree of diversity in the literature regarding the appropriate synthesis of nanoparticles, identification of a suitable particular nanoparticle catalyst composition, nanoparticle support, method of stabilization, and method of synthesis is not a simple task. As with monometallic catalyst particles, the described methods for bimetallic catalyst nanoparticle preparation originate from well-known colloidal chemistry techniques, but each catalytic application requires its own most optimal combination of metals; nanoparticle structure modes; selection of a catalyst support; and pretreatment.

Notably, in effective bimetallic nanoparticle catalysts, the addition of the second metal does not simply "add" its catalytic activity but often leads to synergism between the two metals, both in electronic and geometric effects, as well as the occurrence of mixed sites. For example, the synergetic effect of Pt—Pd system has been shown to decrease Pt electron-deficiency as compared to monometallic Pt, which in turn lowers the strength of the sulfur metal bond, thus leading to improved sulfur tolerance and better activity (R. M. Navarro, B. Pawelec, J. M. Trejo, R. Mariscal, and J. L. G. Fierro, "Hydrogenation of aromatics on sulfur-resistant PtPd bimetallic catalysts", *J. Catal.* 189 (2000) 184). Also, as described in Patent Application Publication No. WO 2007/041605, a Ru—Pt catalyst with Ru excess on the surface resulted in the synergism factor of 4 in ring opening reactions.

With reference to FIG. 1, a general method for preparing monometallic core nanoparticles, and bimetallic core shell nanoparticles, is provided. In step A, the desired core metal (which will be a primary metal if a monometallic nanoparticle is to be prepared, or a secondary metal if a bimetallic core-shell nanoparticle is to be prepared) is added with the desired amount of polymer (PVP) to an ethanol/water or ethylene glycol solution, depending on the reducability of the selected metal, for example as shown herein in the Examples section below. The reaction components are mixed and refluxed under air in step B to form core nanoparticles of particular size and distribution (step C). If a primary metal precursor was used and monometallic nanoparticles are desired, the colloidal nanoparticles are precipitated with acetone, and can then be deposited onto a suitable support (step J) and dried. The PVP can then be removed from the catalyst by calcination (step K) followed by reduction under hydrogen flow.

If a secondary metal precursor was used and a bimetallic core-shell nanoparticle is desired, the core nanoparticle colloidal solution is treated with hydrogen (step D) to prepare the nanoparticles to receive the shell metal. The shell (primary metal) precursor is mixed with water in step E, and nitrogen gas is bubbled through the mixture to replace the air (step F). The metal precursor mixture is then added drop-wise to the core metal colloidal solution (step G), and exposed to a hydrogen-rich environment (step H). The resulting colloidal dispersions of the bimetallic nanoparticles are obtained (step I), precipitated with acetone, and can then be deposited onto a support (step J). The PVP is removed in step K, followed by reduction under hydrogen flow (step L).

Removal of the PVP will enhance catalytic activity of the resulting nanoparticle. The removal of PVP by calcination must occur at a temperature high enough to remove the polymer, but low enough to prevent nanoparticle sintering and reduction of catalyst activity. Typically, temperatures between 200 and 400° C. will be suitable for the duration of 1 to 2 hours.

Figure 2:
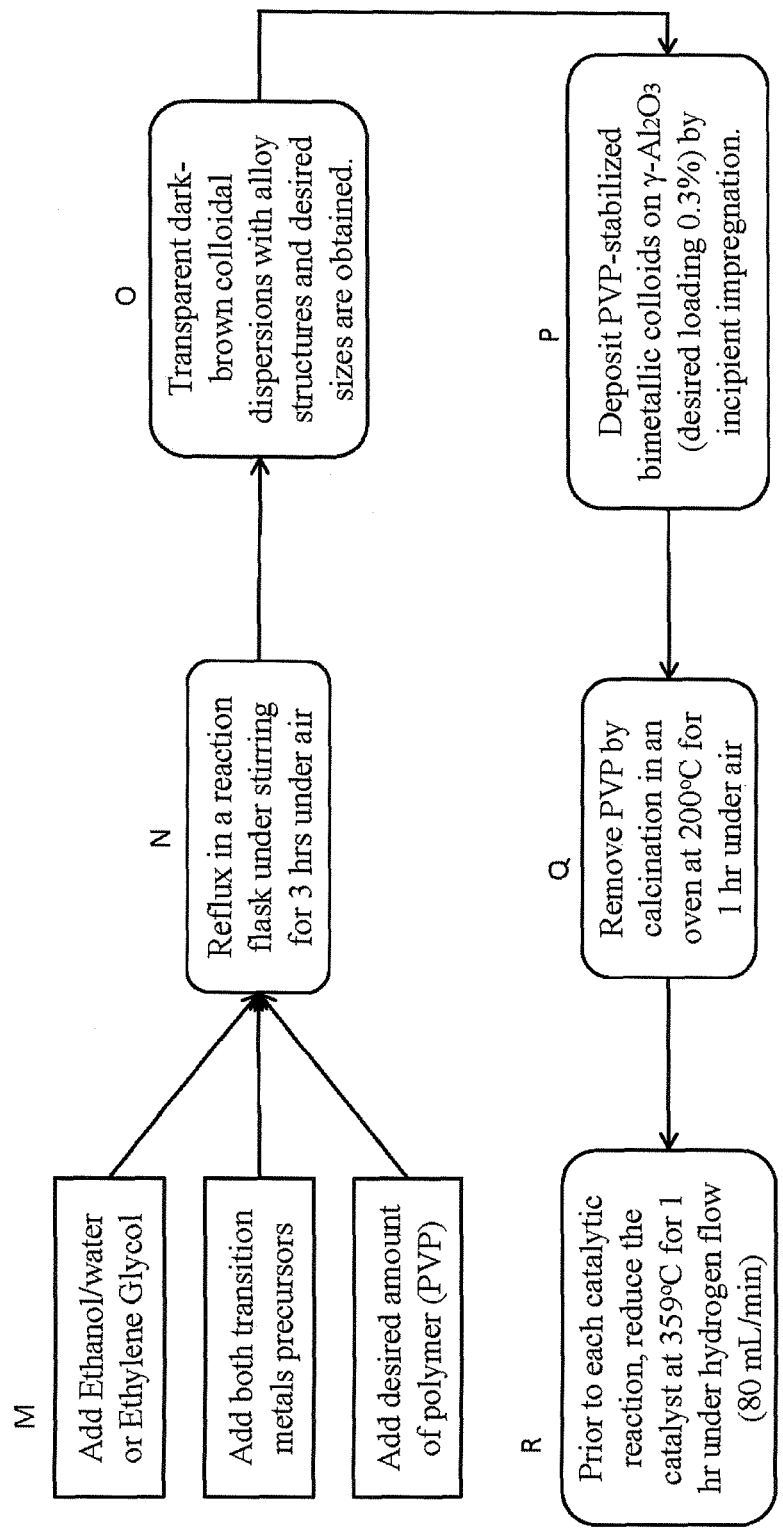
FIG. 2 is a flowchart depicting general steps for bimetallic catalyst synthesis using simultaneous reduction of two metal precursors, to prepare alloyed nanoparticles.

With reference to FIG. 2, the general method for preparing an alloyed nanoparticle catalyst is provided. The metal precursors are added with the PVP to an ethanol/water or ethylene glycol solution (depending on the reducability of the metal, for example, as noted herein in the Examples) in step M. The reaction components are mixed and refluxed under air in step N to form alloyed nanoparticles of particular size (step O). The colloidal nanoparticles can then be deposited onto a suitable support (step P) and dried. The PVP can then be removed from the catalyst by calcination (step Q) followed by reduction under hydrogen flow (step R).

Catalytic Activity

Ring opening of indan over bimetallic polydispersed Pt—Ir catalysts at 325° C. and atmospheric pressure has been previously studied by Boutonnet et al., in which Pt—Ir bimetallic catalysts were synthesized from a microemulsion system. (U. Nylen, J. F. Delgado, S. Jaras, M. Boutonnet, "Low and high-pressure ring opening of indan over 2 wt. % Pt, Ir and bi-metallic $Pt_{25}Ir_{75}$/boehmite catalysts prepared from microemulsion systems", *Appl. Catal. A* 262 (2004) 189). Later, Boutonnet et al. also studied Pt—Ir bimetallic catalysts prepared via traditional impregnation and supported on seven different materials, and found that 2 wt. % $Pt_5Ir_{95}/CeO_2$ is the best catalyst for selective ring opening of indan (U. Nylen, L. Sassu, S. Melis, S. Jaras, and M. Boutonnet, "Catalytic ring opening of naphthenic structures: part I. from laboratory catalyst screening via pilot unit testing to industrial application for upgrading LCO into a high-quality diesel-blending component", Appl. Catal. A 299 (2006) 1). However, no size or structure control was achieved.

U.S. Pat. Nos. 7,045,481; 7,534,741, and 7,601,668 to Zhou, et al., all describe the use of Pt group metals and a second component as precursors for bimetallic nanoparticle formation in the presence of various stabilizers, including polymers, for a variety of catalytic applications. For example, Pd—Pt nanoparticles anchored to a catalyst support by organic molecules and/or prepared in the presence of polymers are used for the direct catalytic synthesis of hydrogen peroxide. In U.S. Pat. Nos. 7,569,508 and 7,655,137, various dispersing agents, including polymers, are used to form controlled bimetallic metal nanoparticles, which are tested for use as reforming catalysts. While these references broadly discuss a wide range of potential bimetallic catalysts, the exemplary catalysts all contain platinum. Given that bimetallic catalyst activity and selectivity are well known to strongly depend on the nanoparticle structure, size and chemical composition, the results obtained with these exemplary platinum embodiments cannot be directly applied to other bimetallic composition to predict suitability for a desired catalytic behavior.

The activity of the bimetallic nanoparticle catalysts described herein was tested using indan as a test compound. Although many catalytic ring opening studies use methylcyclopentane (MCP) as a test compound, the structure of MCP does not closely approximate industrial heavy crude oil feed molecules. By contrast, indan (benzocyclopentane) is a multi-ring compound, and has a structure and properties that more closely approximate petroleum feed molecules. The desired indan ring opening products are 2-ethyltoluene and n-propylbenzene, with the naphthenic ring selectively cleaved only once, leaving the molecular weight unchanged.

Examples of Catalyst Preparation Methods and Catalytic Activity

Embodiments of suitable experimental methods will now be provided, along with preliminary experimental results.

These methods and results are provided as examples only, to allow a person of ordinary skill in the art to understand various aspects of the invention.

EXAMPLE 1

Preparation of Polymer-Stabilized Iridium Spheres

A colloidal solution of PVP-stabilized Ir nanoparticles having spherical structures was prepared using the one-step ethanol/water reduction method [T. Teranishi and M. Miyake, "Size control of palladium nanoparticles and their crystal structures", *Chem. Mater.* 10 (1998) 594]. 50 mL 2.0 mM $H_2IrCl_6$ solution, 167 mL ethanol/water solution ([EtOH]=40 vol. %), and 0.222 g PVP (MW 40,000) were mixed in a 250 mL 3-neck round bottom flask. The mixture was stirred and refluxed under air for 3 hours. Transparent dark-brown colloidal solutions of Ir metal nanoparticles were obtained without any precipitates. Synthesized Ir sphere nanoparticles were deposited on a support for the future use in catalytic reactions. The nanocatalyst support, $\gamma$-$Al_2O_3$ (target loading is 0.3 wt. %), was oven-dried at 120° C. for more than 12 hours. PVP-stabilized Ir colloids were precipitated with acetone, and deposited on $\gamma$-$Al_2O_3$ by wet impregnation. Finally, the catalyst was dried in a fumehood. The obtained Ir/$\gamma$-$Al_2O_3$ catalyst (sphere 1.6 nm) had a loading of 0.18 wt. %.

Prior to the catalytic reactions, the polymers were removed to avoid blockage of the catalyst active sites by the polymer. PVP-stabilized mono- and bimetallic catalysts were calcined at 200° C. in an oven under air for 1 hour. Catalysts were then reduced at 359° C. for 1 hour under hydrogen flow (80 mL/min) by increasing reactor internal temperature from room temperature to 359° C. at a rate of 5° C./min, and then holding for 1 hour. This oxidation-hydrogenation cycle is known to remove PVP from metal nanoparticles at lower temperature than free PVP decomposition. In a previous study, catalysts were calcined in 20% $O_2$/He for 1 hr at 200° C., purged with He for 0.5 hr at 200° C., and then followed by reduction in $H_2$ for 1 hr at 200° C. [R. M. Rioux, H. Song, M. Grass, S. Habas, K. Niesz, J. D. Hoefelmeyer, P. Yang, and G. A. Somorjai, "Monodisperse platinum nanoparticles of well-defined shape: synthesis, characterization, catalytic properties and future prospects", *Top. Catal.* 39 (2006) 3].

EXAMPLE 2

Preparation of Iridium Worm Catalyst

PVP-stabilized Ir nanoparticles with worm-like structures were prepared by a one-step 1-propanol/water reduction method [T. Teranishi and M. Miyake, "Size control of palladium nanoparticles and their crystal structures", *Chem. Mater.* 10 (1998) 594. & X. Zuo, H. Liu, and C. Yue, "Enantioselective hydrogenation of methyl pyruvate over polymer-stabilized and supported iridium clusters", *J. Mol. Catal. A Chem.* 147 (1999) 63]. 50 mL aqueous solution containing 0.1 mmol $H_2IrCl_6$ and 0.116 g PVP (MW 40,000) (PVP/Pd=10/1) were mixed with 150 mL 1-propanol/water solution ([1-PrOH]=90 vol. %) in a 250 mL 3-neck round bottom flask. The mixture was stirred and refluxed under air for 3 hours. Transparent dark-brown colloidal solutions of Ir metal nanoparticles were obtained without any precipitates. PVP-stabilized Ir colloids were precipitated with acetone, and deposited on $\gamma$-$Al_2O_3$ by wet impregnation. Finally, the catalyst was dried in a fumehood. The obtained In $\gamma$-$Al_2O_3$ catalyst (worm-like) had a loading of 0.10 wt. %.

EXAMPLE 3

Preparation of Palladium 2.3 nm Spheres

PVP-stabilized Pd nanoparticles were synthesized by a one-step ethanol/water reduction method. 50 mL of 2.0 mM $PdCl_2$ aqueous solution was prepared by diluting $PdCl_2$ solution (5% w/v) with milliQ water. A mixture of 50 mL 2.0 mM $PdCl_2$ solution, 167 mL ethanol water solution ([EtOH]=40 vol. %), and 0.111 g PVP (MW 40,000) (PVP/Pd=10/1) was stirred and refluxed in a 250 mL 3-nect round bottom flask for 3 hours under air [T. Teranishi and M. Miyake, "Size control of palladium nanoparticles and their crystal structures", *Chem. Mater.* 10 (1998) 594]. Transparent dark-brown colloidal dispersions of Pd metal nanoparticles were obtained without any precipitate. After the synthesis reaction, PVP-stabilized Pd colloids were precipitated with acetone, and deposited on $\gamma$-$Al_2O_3$ by wet impregnation. Finally, the catalyst was dried in a fumehood. The synthesized Pd/$\gamma$-$Al_2O_3$ catalyst (sphere 2.3 nm) had a loading of 0.08 wt. %.

EXAMPLE 4

Preparation of Palladium 4.4 nm Spheres

In general, it is considered that it is difficult to prepare Pd nanoparticles larger than 3 nm in a one-step growth in the presence of PVP. Therefore, a stepwise growth method was used to synthesize Pd nanoparticles with size greater than 3 nm. In the first step, Pd nanoparticles were prepared by a one-step synthesis method. 50 mL 2.0 mM $PdCl_2$ aqueous solution, 167 mL ethanol/water solution ([EtOH]=40 vol. %), and 0.222 g PVP (MW=40,000) (PVP/Pd=20/1) were mixed, stirred, and refluxed for 3 hours under air. In the second step, the growth of Pd atoms on the seed nanoparticles was carried out by mixing 50 mL of 0.6 mM PVP—Pd dispersion from step one with 50 mL of 0.6 mM PdC12 in ethanol/water ([EtOH]=40 vol. %). The mixture was then stirred and refluxed for 3 hours under air. The third and fourth steps were performed similar to the second step with nanoparticles from previous steps as seeds [T. Teranishi and M. Miyake, "Size control of palladium nanoparticles and their crystal structures", *Chem. Mater.* 10 (1998) 594. & Y. Li, E. Boone, and M. A. El-Sayed, "Size effect of PVP—Pd nanoparticles on the catalytic suzuki reactions in aqueous solution", *Langmuir* 18 (2002) 4921.]. Transparent dark-brown colloidal solutions of Pd metal nanoparticles were obtained without any precipitates for all steps. PVP-stabilized Pd colloids from the fourth synthesis step were precipitated with acetone, and deposited on $\gamma$-$Al_2O_3$ by wet impregnation. Finally, the catalyst was dried in a fumehood. The obtained Pd/$\gamma$-$Al_2O_3$ catalyst (sphere 4.4 nm) had a loading of 0.14 wt. %.

EXAMPLE 5

Preparation of Ruthenium 2.3 nm Spheres

PVP-stabilized Ru nanoparticles were synthesized by a one-step ethylene glycol reduction method. At room temperature, $Ru(NO)(NO_3)_3$ and PVP (MW 10,000) were dissolved in 100 mL ethylene glycol (EG) in a 250 mL 3-neck flask under stirring. The concentration of $Ru^{3+}$ was 1.12 mM, and molar ratio of PVP/Ru was 10/1. The mixture was then stirred and refluxed under air. The reduction temperature increased from room temperature to 200° C., and then maintained at 200° C. for 3 hours [Y. Chem, K. Y. Liew, and J. Li, "Size-controlled synthesis of Ru nanoparticles by ethylene glycol reduction", *Mater. Lett.* 62 (2008) 1018]. Transparent dark-brown colloidal dispersions of Ru nanoparticles were obtained without any precipitates. After the synthesis reaction, PVP-stabilized Ru colloidal solution was dialyzed against 3,000 mL milliQ water in 28 mm dialysis tube (3,500 MW cut-off) twice (48 hours each time) to remove EG and unreduced metal salts. PVP-stabilized Ru colloids were deposited on $\gamma$-$Al_2O_3$ by incipient impregnation. Finally, the catalyst was dried in a fumehood. The obtained Ru/$\gamma$-$Al_2O_3$ catalyst (sphere 2.3 nm) had a loading of 0.16 wt. %.

EXAMPLE 6

Preparation of Bimetallic Nanoparticles with Palladium Core and Iridium Shell

Pd—Ir bimetallic nanoparticles with core-shell structures were synthesized by a hydrogen-sacrificial method for Pd—Pt bimetallic colloids preparation [Y. Wang and N. Toshima, "Preparation of Pd—Pt bimetallic colloids with controllable core/shell structures", *J. Phys. Chem. B* 101 (1997) 5301]. 50 mL of 2.0 mM $PdCl_2$ aqueous solution was prepared by diluting $PdCl_2$ solution (5% w/v) with milliQ water. A mixture of 50 mL 2.0 mM $PdCl_2$ solution, 167 mL ethanol/water solution ([EtOH]=40 vol. %), and PVP (MW 40,000) (PVP/Pd=10/1) was stirred and refluxed in a 250 mL 3-neck round bottom flask for 3 hours under air [T. Teranishi and M. Miyake, "Size control of palladium nanoparticles and their crystal structures", *Chem. Mater.* 10 (1998) 594]. Transparent dark-brown colloidal dispersions of Pd metal nanoparticles were obtained without any precipitate.

Core-shell structure preparation: The 250 mL 3-neck flask containing Pd core nanoparticles (Pd(c)) was equipped with a dropping funnel containing 50 mL 0.1 mmol shell metal precursor ($H_2IrCl_6$) aqueous solution. Molar ratio of Ir to Pd was 1/1. Pd core nanoparticle colloidal solution in the reaction flask was treated with hydrogen for 2 hours. Ir Shell precursors in the dropping funnel were bubbled by nitrogen for 5 minutes to replace the air. The aqueous solution of Ir shell metal precursor was then added into the reaction system drop by drop for about 1 hour, and the reaction was continued for at least 5 hours under hydrogen environment. Transparent dark-brown homogeneous colloidal solutions of Pd—Ir bimetallic nanoparticles were obtained without any precipitates. PVP-stabilized Pd(c)Ir(s) nanoparticles were precipitated with acetone, and deposited on $\gamma$-$Al_2O_3$ by wet impregnation. Finally, the catalyst was dried in a fumehood. The synthesized Pd(c)Ir(s)/$\gamma$-$Al_2O_3$ catalyst (core-shell 2.7 nm) had a loading of 0.27 wt. % Pd and 0.39 wt. % Ir.

Notably, Pd—Ir catalysts were also synthesized via traditional impregnation, but these were not stable in the reaction and the activity decreases significantly, which was not the case for the Pd—Ir core-shell catalysts.

EXAMPLES 7, 8, and 9

Preparation of Palladium-Iridium Alloyed Nanoparticles

Three different metal molar ratios of Pd—Ir bimetallic nanoparticles were synthesized: Pd3Ir1 (Pd/Ir molar ratio=3/1) (Example 7), Pd1Ir1 (Example 8), and Pd1Ir3 (Example 9). Pd—Ir bimetallic nanoparticles with alloy structures were prepared by simultaneous reduction of both Pd and Ir precursors using the synthesis method of 2.3 nm Pd nanoparticles (Example 3) [T. Teranishi and M. Miyake, "Size control of palladium nanoparticles and their crystal structures", *Chem. Mater.* 10 (1998) 594.]. Transparent dark-brown colloidal dispersions of Pd—Ir bimetallic nanoparticles were obtained without any precipitate. Solvent and unreduced metal salts were removed by dialysis (24 hours). PVP-stabilized Pd1Ir3, Pd1Ir1, and Pd3Ir1 colloids were deposited on $\gamma$-$Al_2O_3$ by incipient impregnation. Finally, all the catalysts were dried in a fumehood. The obtained Pd3Ir1/$\gamma$-$Al_2O_3$ (alloy 2.5 nm), Pd1Ir1/$\gamma$-$Al_2O_3$ (alloy 2.2 nm), and Pd1Ir3/$\gamma$-$Al_2O_3$ (alloy 2.3 nm) catalysts had loadings of 0.25 wt. % Pd and 0.08 wt. % Ir, 0.09 wt. % Pd and 0.10 wt. % Ir, and 0.05 wt. % Pd and 0.11 wt. % Ir, respectively.

EXAMPLES 10, 11, and 12

Preparation of Iridium-Ruthenium Alloyed Nanoparticles

Three different metal molar ratios of Ir—Ru bimetallic nanoparticles were synthesized: Ir3Ru1 (Ir/Ru molar ratio=3/1) (Example 10), Ir1Ru1 (Example 11), and Ir1Ru3 (Example 12). Ir—Ru bimetallic nanoparticles with alloy structures were synthesized by simultaneous reduction of both Ir and Ru precursors using the same synthesis method used to prepare 2.3 nm Ru nanoparticles (Example 5) [Y. Chem, K. Y. Liew, and J. Li, "Size-controlled synthesis of Ru nanoparticles by ethylene glycol reduction", *Mater. Lett.* 62 (2008) 1018]. Transparent dark-brown colloidal dispersions of Ir—Ru bimetallic nanoparticles were obtained without any precipitates. EG and unreduced metal salts were removed by dialysis twice (48 hours each time). PVP-stabilized Ir3Ru1, Ir1Ru1, and Ir1Ru3 colloids were deposited on $\gamma$-$Al_2O_3$ by incipient impregnation. Finally, all the catalysts were dried in a fumehood. The obtained Ir3Ru1/$\gamma$-$Al_2O_3$ (alloy 1.9 nm), Ir3Ru1/$\gamma$-$Al_2O_3$ (alloy 2.1 nm), and Ir3Ru1/$\gamma$-$Al_2O_3$ (alloy 2.1 nm) catalysts had loadings of 0.16 wt. % Pd and 0.02 wt. % Ir, 0.04 wt. % Pd and 0.04 wt. % Ir, and 0.03 wt. % Pd and 0.06 wt. % Ir, respectively.

EXAMPLES 13, 14, and 15

Preparation of Palladium-Ruthenium Alloyed Nanoparticles

Three different metal molar ratios of Pd—Ru bimetallic nanoparticles were synthesized: Pd3Ru1 (Pd/Ru molar ratio=3/1) (Example 13), Pd1Ru1 (Example 14), and Pd1Ru3 (Example 15). Pd—Ru bimetallic nanoparticles with alloy structures were synthesized by simultaneous reduction of both Pd and Ru precursors using the same synthesis method used to prepare 2.3 nm Ru nanoparticles (Example 5). The reduction temperature for Pd3Ru1 was 160° C. instead of 200° C. [Y. Chem, K. Y. Liew, and J. Li, "Size-controlled synthesis of Ru nanoparticles by ethylene glycol reduction", *Mater. Lett.* 62 (2008) 1018]. Transparent dark-brown colloidal dispersions of Ir—Ru bimetallic nanoparticles were obtained without any precipitates. EG and unreduced metal salts were removed by dialysis twice (48 hours each time). PVP-stabilized Pd3Ru1, Pd1Ru1, and Pd1Ru3 colloids were deposited on $\gamma$-$Al_2O_3$ by incipient impregnation. Finally, all the catalysts were dried in a fumehood. The obtained Pd3Ru1/$\gamma$-$Al_2O_3$ (alloy 5.3 nm), Pd3Ru1/$\gamma$-$Al_2O_3$ (alloy 3.6 nm), and Pd3Ru1/$\gamma$-$Al_2O_3$ (alloy 2.9 nm) catalysts had loadings of 0.10 wt. % Pd and 0.04 wt. % Ir, 0.07 wt. % Pd and 0.08 wt. % Ir, and 0.02 wt. % Pd and 0.07 wt. % Ir, respectively.

EXAMPLE 16

Method for Testing and Analyzing Catalyst Performance

In order to propose the optimal catalyst for selective ring opening, ring opening of indan (benzocyclopentane) was carried out with the synthesized catalysts, and the catalytic performance was compared to an industrial Pt—Ir catalyst.

Experimental setup and analysis: Ring opening of indan was carried out in a packed bed reactor. A continuous fixed bed catalytic reactor, which is a 16" in long stainless steel tube with an inner diameter of ½", was packed with the catalyst corresponding to 1.2 mg active metal(s) (diluted with 2 g 150 mesh SiC) and encircled by a furnace. The reactant, indan, was fed into the catalytic system by bubbling 50 mL/min $H_2$ through indan at a constant temperature bath at 10° C. Indan flow rates ($2.1 \times 10^{-5}$ to $5.1 \times 10^{-5}$ g/min) were determined from GC areas; the GC was calibrated using a HPLC pump with known indan flow rate. A high $H_2$-to-indan molar ratio (4800 to 11600) was used to avoid coke formation. 99.999% pure Ar and $H_2$ flows were controlled by calibrated mass flow controllers (Sierra Instruments). The catalytic reactions were carried out at an internal temperature of 336° C. at atmospheric pressure. The reactor up- and down-streamlines were heated to 220° C. to preheat reactants and avoid product condensation. The outgoing stream was analyzed on-line with a Varian 430-GC-FID every 30 minutes since reaction was started. The GC capillary column is a WCOT fused silica column, 50 m length×0.32 mm inside diameter×1.2 μm thickness. Initially, the oven temperature was stabilized at 40° C. for 2.5 min; and then it started to increase at a rate of 30° C./min until the temperature reached 110° C. and maintained at 110° C. for 20 min. FID and injector temperature was 280° C., split ratio was 1, and the flow rate was constant at 25 mL/min.

Reaction product identification: It has been reported that ring opening of indan over Pt—Ir catalysts results in major ring opening products ($C_6$-$C_9$) of 2-ethyltoluene, n-propylbenzene, o-xylene, ethylbenzene, toluene, and benzene [U. Nylen, L. Sassu, S. Melis, S. Jaras, and M. Boutonnet, Catalytic ring opening of naphthenic structures: part I . . . ", *Appl. Catal. A* 299 (2006) 1]. However, the commercially relevant products of ring opening of indan are 2-ethyltoluene and n-propylbenzene, confirming that the naphthenic ring has been cleaved only once. From cetane number point of view, n-propylbenzene (eliminating branch) is more favorable of these two products, and further dealkylation, which results in toluene, benzene and lights, is highly undesired [U. Nylen, J. F. Delgado, S. Jaras, M. Boutonnet, "Low and high-pressure ring opening of indan . . . ", *Appl. Catal. A* 262 (2004) 189; U. Nylen, L. Sassu, S. Melis, S. Jaras, and M. Boutonnet, Catalytic ring opening of naphthenic structures: part I . . . ", *Appl. Catal. A* 299 (2006) 1]

In order to identify the peaks, retention times of major ring opening products were compared with those of the pure reference compounds. Compounds with the GC retention times less than that of benzene were named as "lights"; and products other than the major products and lights were called "others".

The reactant (indan, indene, and impurities), major reaction products, and by-products were confirmed by GC-MS. GC-MS was performed with an Agilent Technologies 7890 GC coupled with 5975C MSD (single quadrupole mass spectrometry). The GC column used is a ZB-50 (Phenomenex) column, 30 m length×25 mm i.d.×25 μm thickness. Oven temperature was stabilized at 40° C. for 0.5 min, then increased to 110° C. at 30° C./min to, and then increased to 280° C. at 50° C./min.

Indan conversion and selectivities are reported on mass basis, as FID detector is a mass-sensitive analyzer that responds to the number of carbon atoms entering per unit of time. After the steady state was achieved (at 150 min time on stream), no more than 5% deviation in the mass balance was observed (typically, within 2%) as compared to the mass flow of incoming indan. Raw GC results were corrected for indan impurities and used for data analysis. Indan purified by distillation contains 0.09% of benzene, 0.15% of n-propylbenzene, 0.02% of 2-ethyltoluene, 0.02% of lights, and 2.91% of others. Raw GC results from catalytic reactions were corrected for impurities, and all calculations for indan conversion and product selectivities were based on the corrected GC results.

The indan conversion, X, was found as $$X = \frac{A_T - A_{indan}}{A_T} \times 100\%$$

$A_T$ stands for the total GC area and includes indan, indene, major reaction products, lights, others, and by-products.

The catalytic activities were found based on indan inlet flow rate, conversion, and catalyst loading in the reactor (typically, 1.2 mg of active metal(s), unless indicated otherwise).

Selectivity to product i, $S_i$, was determined as $$S_i = \frac{A_i}{A_T - A_{indan}} \times 100\%$$

For most of the catalysts tested, 8 (or 6) data points were obtained at 150, 180, 210 (and 240) minutes of time on stream with a duplicate experiment (unless stated otherwise). The data are presented as average. Within the indicated times on stream the catalysts did not show noticeable deactivation.

EXAMPLE 17

Catalytic Performance of Preliminary Catalysts Tested

Table 1 contains data on the catalytic performance of the synthesized catalysts, which were tested for indan ring opening ability using the method described above in Example 16. Comparisons of catalytic performances among synthesized catalysts (Example 1-15) and industrial Pt—Ir catalysts are shown in Table I. In this study, "single cleavage selectivity" is defined as the sum of selectivities to 2-ethyltoluene and n-propylbenzene, which are the desired products, when the naphthenic ring is cleaved only once.

Generally, the synthesized Pd—Ir, Ru—Ir, and Ir catalysts with predominant Ir content show higher ring opening selectivity at comparable or higher indan conversion than the industrial Pt—Ir catalyst with lower lights production. Monometallic Ir nanocatalyst and bimetallic Pd—Ir nanocatalyst with core-shell structure showed superior activity and selectivity as compared to the industrial Pt—Ir catalyst.

Catalysts that were not found to be active (Pd 4.4 nm, Pd3Ir1, Pd3Ru1, and Pd1Ru1) are not included in the comparison of selectivities.

The above-described embodiments of the present invention are intended to be examples only. Alterations, modifica-

TABLE I

Catalytic performance of the synthesized catalysts in the ring opening of indan (one standard deviation is shown in parentheses).

| Catalysts | Indan flow $10^{-5}$ g/min | Indan conversion % | Activity $10^{-3}$ $g_{indan}/(g_{metal} \cdot min)$ | Selectivities, % Single cleavage | Lights |
|---|---|---|---|---|---|
| here | 2.5 | 45 | 19 (1) | 75 (1) | 4.3 (0.2) |
| 2. Ir worm | 2.3 | 25 | 5.1 (0.2) | 90.5 (0.5) | 2.32 (0.02) |
| 3. Pd 2.3 nm | 2.2 | 3 | 0.59 (0.05) | 74 (4) | 15 (2) |
| 4. Pd 4.4 nm | 3.3 | 0.3 | 0 | — | — |
| 5. Ru 2.3 nm | 2.8 | 45 | 10.5 (0.6) | 9.9 (0.2) | 22.7 (0.3) |
| 6. Pd(c)Ir(s) | 2.3 (0.2) | 90 (0) | 17 (1) | 58 (6) | 7 (1) |
| 7. Pd3Ir1 | 2.9 (0.4) | 0.5 (0) | 0.11 (0.01) | — | — |
| 8. Pd1Ir1 | 3.6 (0.7) | 9 (4) | 2.4 (1.0) | 74 (1) | 4.4 (0.1) |
| 9. Pd1Ir3 | 2.7 (0.1) | 63 (11) | 13 (2) | 64 (2) | 5.2 (0.3) |
| 10. Ir3Ru1 | 2.4 | 60 | 9.8 (0.3) | 67 (1) | 5.7 (0.3) |
| 11. Ir1Ru1 | 2.8 | 45 | 3.4 (0.3) | 28.1 (0.1) | 16.4 (0.2) |
| 12. Ir1Ru3 | 3 (1) | 4 (1) | 1.2 (0.1) | 36 (4) | 18 (2) |
| 13. Pd3Ru1 | 2.8 (0.3) | 0.5 (0) | 0.14 (0.02) | — | — |
| 14. Pd1Ru1 | 4.6 | 0.5 | 0.25 (0.04) | — | — |
| 15. Pd1Ru3 | 3.6 | 7 | 2.4 (0.2) | 5.9 (0.3) | 63 (2) |
| Industrial Pt—Ir | 2.5 (0.1) | 63 (6) | 14 (1) | 44 (4) | 11 (1) |

What is claimed is:

1. A bi-metallic nanoparticle ring-opening catalyst composition comprising:
a plurality of monodispersed bimetallic nanoparticles, each of the monodispersed nanoparticles having a size between 1-5 nm in diameter, and each of the monodispersed bimetallic nanoparticles comprising:
a primary non-platinum transition metal having ring-opening catalytic activity; and
a secondary transition metal.

2. The ring-opening catalyst composition as in claim 1, further comprising a capping agent.

3. The bimetallic nanoparticle ring-opening catalyst as in claim 1, wherein the primary non-platinum transition metal has suitable activity and selectivity in catalyzing single-cleavage ring-opening reactions.

4. The bimetallic nanoparticle ring-opening catalyst as in claim 1, wherein the primary non-platinum transition metal is a metal selected from the group consisting of: palladium, ruthenium, rhodium, iridium, and rhenium.

5. The bimetallic nanoparticle ring-opening catalyst as in claim 1, wherein the primary non-platinum transition metal is iridium.

6. The bimetallic nanoparticle ring-opening catalyst as in claim 1, wherein the secondary transition metal is a catalytically active transition metal.

7. The bimetallic nanoparticle ring-opening catalyst as in claim 6, wherein the secondary transition metal has ring-opening catalytic activity.

8. The bimetallic nanoparticle ring-opening catalyst as in claim 6, wherein the secondary transition metal is a hydrodesulfurization catalyst.

9. The bimetallic nanoparticle ring-opening catalyst as in claim 6, wherein the secondary transition metal is a hydrogenation catalyst.

10. The bimetallic nanoparticle ring-opening catalyst as in claim 1, wherein the secondary transition metal is a readily available, catalytically inactive transition metal.

11. The bimetallic nanoparticle ring-opening catalyst as in claim 1, wherein the secondary transition metal is a metal selected from the group consisting of: palladium, nickel, ruthenium, rhenium, and rhodium.

12. The bimetallic nanoparticle ring-opening catalyst as in claim 1, wherein the secondary transition metal is palladium.

13. The bimetallic nanoparticle ring-opening catalyst as in claim 1, wherein the secondary transition metal is nickel.

14. The bimetallic nanoparticle ring-opening catalyst as in claim 1, wherein the nanoparticle is an alloy of the primary and secondary metal.

15. The bimetallic nanoparticle ring-opening catalyst as in claim 14, wherein the primary non-platinum transition metal is iridium and the secondary metal is palladium.

16. The bimetallic nanoparticle ring-opening catalyst as in claim 14, wherein the primary non-platinum transition metal is selected from the group consisting of: iridium, palladium, ruthenium, rhodium, and rhenium; and wherein the secondary metal is a different metal than the primary metal, and is selected from the group consisting of: palladium, ruthenium, rhenium, and rhodium.

17. The bimetallic nanoparticle ring-opening catalyst as in claim 1, wherein the nanoparticle comprises a core-shell structure, and wherein the secondary metal comprises the nanoparticle core and the primary non-platinum transition metal comprises the nanoparticle shell.

18. The bimetallic nanoparticle ring-opening catalyst as in claim 17, wherein the primary non-platinum transition metal is iridium and the secondary metal is palladium.

19. The bimetallic nanoparticle ring-opening catalyst as in claim 17, wherein the primary non-platinum transition metal is iridium and the secondary metal is nickel.

20. The bimetallic nanoparticle ring-opening catalyst as in claim 17, wherein the primary non-platinum transition metal is selected from the group consisting of: iridium, palladium, ruthenium, rhodium, and rhenium; and wherein the secondary metal is a different metal than the primary metal, and is selected from the group consisting of: palladium, nickel, ruthenium, rhenium, and rhodium.

21. The bimetallic nanoparticle ring-opening catalyst as in claim 1, wherein the nanoparticle comprises a stabilizing agent.

22. The bimetallic nanoparticle ring-opening catalyst as in claim 21, wherein the stabilizing agent is polyvinylpyrrolidone.

23. The bimetallic nanoparticle ring-opening catalyst as in claim 1, further comprising a support loaded with the nanoparticles.

24. The bimetallic nanoparticle ring-opening catalyst as in claim 23, wherein the support is gamma-alumina.

25. The bimetallic nanoparticle ring-opening catalyst as in claim 23, wherein the support is gamma-alumina having a minimum pore size of at least 5 nm.

26. A monometallic ring-opening catalyst composition comprising:
- a plurality of monodispersed nanoparticles, each of the monodispersed nanoparticles having a size between 1-5 nm in diameter, each of the monodispersed nanoparticles comprising a primary non-platinum transition metal having ring-opening catalytic activity; and
- a support having a minimum pore size of at least 5 nm.

27. The monometallic ring-opening catalyst composition as in claim 26, further comprising a stabilizing agent.

28. The monometallic ring-opening catalyst composition as in claim 27, wherein the stabilizing agent is polyvinylpyrrolidone.

29. The monometallic ring-opening catalyst composition as in claim 26, wherein the support is gamma-alumina.

30. The monometallic ring-opening catalyst composition as in claim 26, wherein the primary non-platinum transition metal is selected from the group consisting of: palladium, ruthenium, rhodium, iridium, and rhenium.

31. The monometallic ring-opening catalyst composition as in claim 26, wherein the primary non-platinum transition metal is iridium.

32. A method for forming a platinum-free nanoparticle ring-opening catalyst, the method comprising the steps of:
- providing a primary metal precursor and a stabilizing polymer, the primary metal precursor comprising a primary metal having ring-opening catalytic activity;
- refluxing the primary metal precursor with the stabilizing polymer to create a colloidal dispersion of a polymer-stabilized primary metal nanoparticle;
- adding acetone to the colloidal dispersion to precipitate polymer-stabilized nanoparticles therefrom;
- depositing the precipitated nanoparticles onto a support, the support having a minimum pore size of at least 5 nm;
- calcining the deposited nanoparticles to remove the stabilizing polymer from the nanoparticles; and
- reducing the deposited nanoparticles in a hydrogen-rich environment.

33. The method as in claim 32, wherein the primary metal is palladium, ruthenium, rhodium, iridium, or rhenium.

34. The method as in claim 32, wherein the primary metal is iridium.

35. The method as in claim 32, wherein the stabilizing polymer is polyvinylpyrrolidone.

36. The method as in claim 32, wherein the support comprises gamma-alumina.

37. The method as in claim 32, further comprising the step of oven drying the support prior to the step of depositing the precipitated nanoparticles.

38. The method as in claim 37, wherein the nanoparticles are deposited onto the support by wet impregnation.

39. A method for forming a platinum-free nanoparticle ring-opening catalyst, the method comprising the steps of:
- providing a secondary metal precursor and a stabilizing polymer;
- refluxing the primary metal precursor with the stabilizing polymer to create a colloidal dispersion of a polymer-stabilized secondary metal nanoparticle;
- providing a reduced primary metal precursor, the primary metal precursor comprising a primary metal having ring-opening catalytic activity;
- reducing and hydrogenating the polymer-stabilized secondary metal nanoparticles;
- combining the hydrogenated polymer-stabilized secondary metal nanoparticle with the reduced primary metal precursor in a hydrogen-rich environment to generate polymer-stabilized nanoparticles having a primary metal shell deposited over a secondary metal core;
- adding acetone to precipitate the polymer-stabilized nanoparticles;
- depositing the polymer-stabilized nanoparticles onto a support having a minimum of at least 5 nm;
- calcining the deposited nanoparticles to remove the polymer from the nanoparticles; and
- reducing the nanoparticles in a hydrogen-rich environment.

40. The method as in claim 39, wherein the primary metal is palladium, ruthenium, rhodium, iridium, or rhenium.

41. The method as in claim 39, wherein the primary metal is iridium.

42. The method as in claim 39, wherein the secondary metal precursor comprises a secondary metal having catalytic activity.

43. The method as in claim 39, wherein the secondary metal precursor comprises iridium, palladium, ruthenium, rhenium, rhodium, or nickel.

44. The method as in claim 39, wherein the primary metal precursor comprises iridium and the secondary metal precursor comprises palladium.

45. The method as in claim 39, wherein the primary metal precursor comprises iridium and the secondary metal precursor comprises nickel.

46. The method as in claim 39, wherein the primary metal precursor and the secondary metal precursor are the same.

47. The method as in claim 32, wherein the stabilizing polymer is polyvinylpyrrolidone.

48. The method as in claim 32, wherein the support comprises gamma-alumina.

49. The method as in claim 32, further comprising the step of oven drying the support prior to the step of depositing the precipitated nanoparticles.

50. The method as in claim 37, wherein the nanoparticles are deposited onto the support by wet impregnation.

51. A method for forming a platinum-free nanoparticle ring-opening catalyst, the method comprising the steps of:
- refluxing a mixture of a primary metal precursor with a secondary metal precursor and a stabilizing polymer to generate a colloidal dispersion of alloyed nanoparticles, the primary metal precursor comprising a metal having ring-opening catalytic activity;
- adding acetone to the colloidal dispersion to precipitate the alloyed nanoparticles therefrom;
- depositing the polymer-stabilized bimetallic nanoparticles onto a support having a minimum pore size of at least 5 nm;
- calcining the deposited nanoparticles to remove the polymer from the nanoparticles; and
- reducing the deposited nanoparticles in a hydrogen-rich environment.

52. The method as in claim 51, wherein the primary metal is palladium, ruthenium, rhodium, iridium, or rhenium.

53. The method as in claim 51, wherein the primary metal is iridium.

54. The method as in claim 51, wherein the secondary metal precursor comprises a secondary metal having catalytic activity.

55. The method as in claim 54, wherein the secondary metal precursor comprises iridium, palladium, ruthenium, rhenium, or rhodium.

56. The method as in claim 51, wherein the primary metal precursor comprises iridium and the secondary metal precursor comprises palladium.

57. The method as in claim 51, wherein the stabilizing polymer is polyvinylpyrrolidone.

58. The method as in claim 51, wherein the support comprises gamma-alumina.

59. The method as in claim 51, further comprising the step of oven drying the support prior to the step of depositing the precipitated nanoparticles.

60. The method as in claim 59, wherein the nanoparticles are deposited onto the support by wet impregnation.

61. A method for effecting selective cleavage of a naphthenic ring, the method comprising the steps of:
    preparing a bimetallic nanoparticle catalyst according to claim 1, including:
        refluxing a mixture of a primary metal precursor with a secondary metal precursor and a stabilizing polymer to generate a colloidal dispersion of alloyed nanoparticles, the primary metal precursor comprising a metal having ring-opening catalytic activity;
        adding acetone to the colloidal dispersion to precipitate the alloyed nanoparticles therefrom;
        depositing the polymer-stabilized bimetallic nanoparticles onto a support having a minimum pore size of at least 5 nm;
        calcining the deposited nanoparticles to remove the polymer from the nanoparticles;
        reducing the deposited nanoparticles in a hydrogen-rich environment; and
    reacting a composition containing naphthenic ring-containing compounds with hydrogen at a temperature greater than 300° C. in the presence of the bimetallic nanoparticle.

62. The method as in claim 61, further comprising the step of separating the bimetallic nanoparticle from the reaction products.

63. The method as in claim 61, wherein the composition containing naphthenic ring-containing compounds is a heavy oil fraction.

* * * * *

UNITED STATES PATENT AND TRADEMARK OFFICE
CERTIFICATE OF CORRECTION

| | | Page 1 of 1 |
|---|---|---|
| PATENT NO. | : 9,040,449 B2 | |
| APPLICATION NO. | : 13/748370 | |
| DATED | : May 26, 2015 | |
| INVENTOR(S) | : Natalia Semagina et al. | |

It is certified that error appears in the above-identified patent and that said Letters Patent is hereby corrected as shown below:

Claims

At Claim 1, Column 17, Line 43: Following "A" delete "bi-metallic" and insert --bimetallic--.

Signed and Sealed this
Tenth Day of November, 2015

Michelle K. Lee
*Director of the United States Patent and Trademark Office*